(12) United States Patent
Gibbs et al.

(10) Patent No.: US 6,388,248 B1
(45) Date of Patent: May 14, 2002

(54) CONTROL VOLTAGE ISOLATION SYSTEM FOR ELECTRICAL ROTATING APPARATUS UTILIZING FIBER OPTICS AND ASSOCIATED METHOD

(75) Inventors: Irving A. Gibbs, Fletcher; Charles A. Morse, Arden; Lawrence B. Farr, Asheville, all of NC (US); Bruce R. Quayle, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 27 days.

(21) Appl. No.: 09/611,138

(22) Filed: Jul. 6, 2000

(51) Int. Cl.[7] .............................. H03M 1/60; H03C 3/00
(52) U.S. Cl. ........................ 250/227.23; 250/227.18; 250/227.24; 250/214 R; 250/551; 327/101; 341/157
(58) Field of Search .................... 250/214 R, 227.18, 250/227.23, 227.24, 551; 327/101; 341/157

(56) References Cited

U.S. PATENT DOCUMENTS

| | | | | |
|---|---|---|---|---|
| 4,502,937 A | * | 3/1985 | Yagi ............................ 204/406 |
| 5,031,234 A | * | 7/1991 | Primas et al. ............... 359/152 |
| 5,274,361 A | * | 12/1993 | Snow .......................... 345/166 |
| 5,371,777 A | * | 12/1994 | Koehler et al. ............. 378/108 |
| RE34,899 E | * | 4/1995 | Gessaman et al. .......... 341/157 |
| 5,414,345 A | * | 5/1995 | Rogers ....................... 324/72.5 |
| 5,495,193 A | * | 2/1996 | Nukui ......................... 327/101 |
| 5,530,723 A | * | 6/1996 | Maplestone ................. 375/344 |
| 6,014,076 A | * | 1/2000 | Luzzader ..................... 340/521 |
| 6,292,522 B1 | * | 9/2001 | Jeng et al. ................... 375/376 |

FOREIGN PATENT DOCUMENTS

JP          11108967 A   *   4/1999

* cited by examiner

Primary Examiner—Robert H. Kim
Assistant Examiner—Allen C. Ho
(74) Attorney, Agent, or Firm—Martin J. Moran

(57) ABSTRACT

An isolation system is provided for generating a control voltage in a low voltage control system that is representative of the input voltage in a high voltage power system of an excitation system, such as in a rotating electrical apparatus. The control voltage isolation system includes a voltage-controlled oscillator for converting the input voltage into a first frequency signal corresponding to the input voltage. Fiber optic conversion and receiving devices are employed in conjunction with a fiber optic cable to transmit the first frequency signal from the high voltage power system to the low voltage control system. Utilizing a fiber optic device provides voltage isolation between the power system and the control system. The use of a fiber optic device for voltage isolation also resists the damaging effects of relatively high transient currents and voltages from affecting sensitive semiconductor components and the like in the control system. A microprocessor and counter device can also be utilized in association with the isolation system to reconstruct the input voltage by integrating the frequency signal received from the power system into a control voltage representative of the input voltage. A method associated with the isolation system is also disclosed.

19 Claims, 1 Drawing Sheet

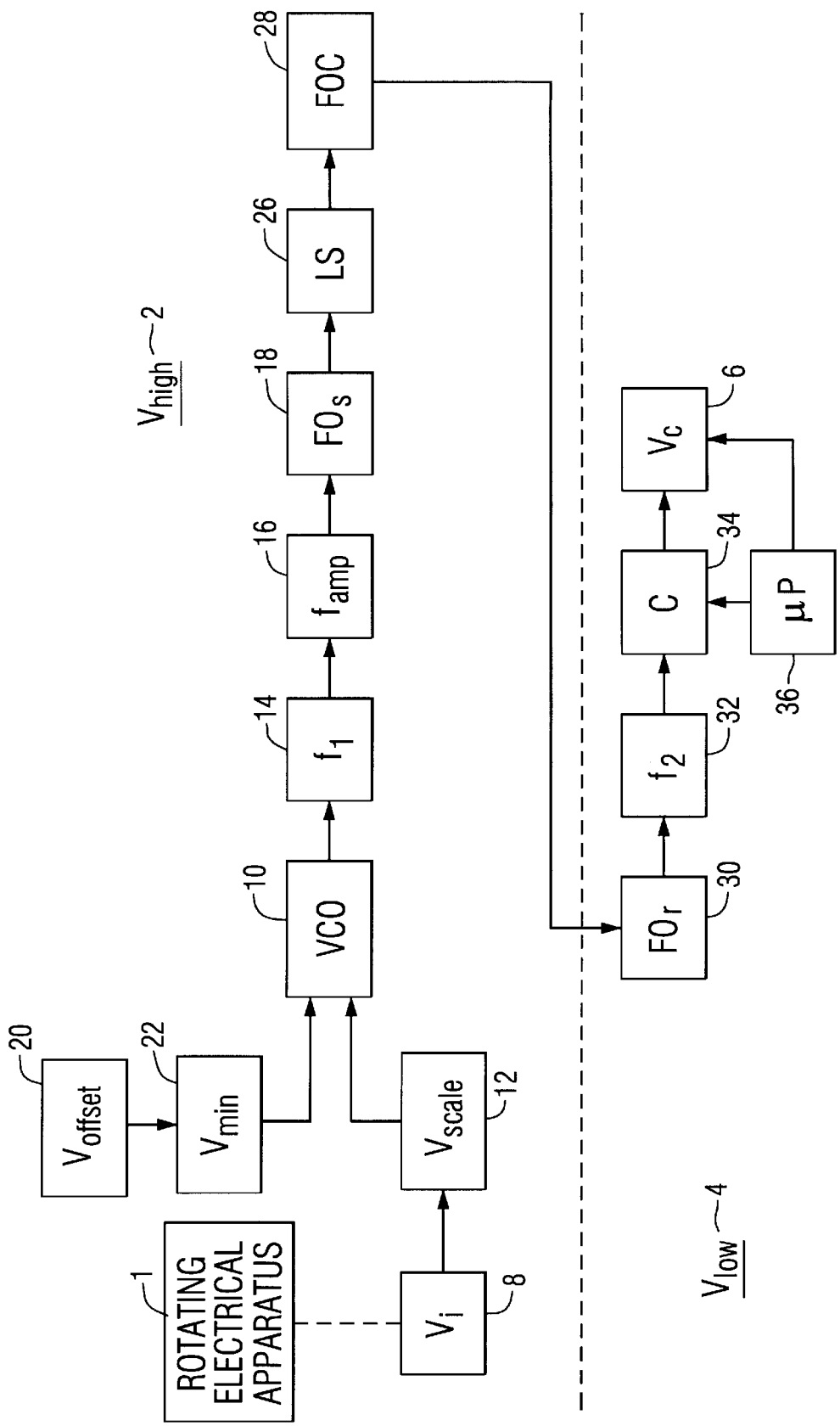

CONTROL VOLTAGE ISOLATION SYSTEM FOR ELECTRICAL ROTATING APPARATUS UTILIZING FIBER OPTICS AND ASSOCIATED METHOD

BACKGROUND OF THE INVENTION

1. Field of the Invention

The present invention generally relates to providing voltage isolation between separate systems in an electrical rotating apparatus. The present invention more particularly relates to providing voltage isolation between a power system and a control system in an electrical rotating apparatus.

2. Background Information

It has been known to provide voltage isolation between different electrical systems in an electrical apparatus in a variety of ways.

Voltage isolation is particularly necessary in situations where an excessive transient current or voltage in a power system can damage sensitive electrical equipment such as semiconductor devices in a control system. A conventional system can provide voltage isolation by using first and second photoisolator chips each separately coupled to a transducer for converting and transmitting a signal between separate electrical systems in an electrical apparatus. Such voltage isolation specifically utilizes an LED phototransistor device for converting an electrical signal into light in a first system; transmitting the converted signal to a second system; and, converting the light signal into an electrical signal in the second system to provide voltage isolation between the separate electrical systems. However, such photoisolator chips are generally only useful for about a 1000 v to 2000 v potential difference between systems for which voltage isolation is desired. This conventional method for providing voltage isolation is typically employed in conjunction with excitation systems such as those employed in motor drives, for example, and may employ voltage-controlled oscillators in providing voltage isolation.

Traditional voltage isolation systems and methods can also result in signal attenuation or otherwise adversely affect the integrity of the transmitted signal by changing phase, amplitude and frequency characteristics among others.

Therefore, there is an unsatisfied need in the art for a system and method that can effectively isolate voltage between independent electrical systems while maintaining the integrity of signals converted and transmitted between the independent systems in an electrical apparatus.

SUMMARY OF THE INVENTION

The fiber optic voltage isolated system of the present invention has met the above-mentioned needs. The present invention is employed in a rotating electrical apparatus that includes a power system having an input voltage and a control system that uses a signal representative of and corresponding to the input voltage.

The present invention provides a system for generating a control voltage in a low voltage control system that is representative of the input voltage in an associated high voltage power system. The system includes an oscillating device for converting the input voltage into a first frequency signal corresponding to the input voltage. This first frequency signal has a frequency which is preferably linearly proportional to the input voltage of the power system. The oscillating means is preferably a voltage-controlled oscillating means.

In the associated power system, a fiber optic transmission device is connected to the oscillating device for converting the first frequency signal into a light signal. A fiber optic cable device is provided to transmit the light signal from the power system to the control system. A fiber optic receiving means is connected to the fiber optic cable device and converts the light signal into a second frequency signal. A reconstruction apparatus is also provided for receiving the second frequency signal and reconstructing a control voltage in the control system representative of the input voltage in the power system.

The reconstruction means in the present invention can also include a counting means coupled to the fiber optic receiving means for providing an indication of the frequency of the second frequency signal. A processor or microprocessor can also be coupled to the counting means to reconstruct the control voltage by sampling the counting means at fixed time intervals.

A method associated with the isolation system of the present invention is also provided.

It is therefore an object of the present invention to provide voltage isolation between a power system and a control system in a rotating electrical apparatus.

It is a further object of the present invention to resist loss of signal integrity between a power system and a control system by employing a fiber optic cable means for transmitting a signal from a power system to a control system.

It is a further object of the present invention to reduce the harmonic content of a signal transmitted between electrically isolated systems.

These and other objects of the present invention will be more fully understood from the following description of the invention and by reference to the figures and claims appended hereto.

BRIEF DESCRIPTION OF THE DRAWING

A full understanding of the invention can be gained from the following detailed description of the invention when read in conjunction with the accompanying drawing in which:

The FIGURE is a functional block diagram of an embodiment of the present invention.

DETAILED DESCRIPTION OF THE EMBODIMENTS

Referring now to the FIGURE, in the form of the invention shown, separate systems in an excitation system for a rotating electrical apparatus (1) include a power system or comparatively high voltage side $V_{high}$ (2) and a control system or comparatively low voltage side $V_{low}$ (4). A system is provided for generating a control voltage $V_c$ (6) in the control system $V_{low}$ (4) representative of the input voltage $V_i$ (8) in the power system $V_{high}$ (2).

The input voltage $V_i$ (8) is an alternating current (AC) voltage preferably in the range of about 10 mv to 2000 v having a fundamental frequency of about 50 Hz to 60 Hz. A voltage-controlled oscillator VCO (10) receives the input voltage $V_i$ (8) in the power system $V_{high}$ (2) preferably from the voltage scaling apparatus $V_{scale}$ (12). The voltage-controlled oscillator VCO (10) can be a suitable apparatus such as one sold under the trade-designated component number VFC100AG.

The scaling apparatus $V_{scale}$ (12) is optionally provided to reduce the input voltage $V_i$ (8) to a suitable functional amplitude for its introduction to the voltage-controlled oscillator VCO (10). The scaling apparatus $V_{scale}$ (12) is a suitable arrangement of operational amplifiers and resistors known to those skilled in the art that can be used to reduce the input voltage $V_i$ (8) to an appropriate level for input to the voltage-controlled oscillator VCO (10). The amplitude of the input voltage $V_i$ (8) is preferably amplified or reduced by a suitable factor necessary to accommodate its introduction to the VCO (10). This amplification or reduction factor can be in the range of approximately 20 to 100 times with regard to the function of the scaling apparatus $V_{scale}$ (12).

Referring again to the FIGURE, the voltage-controlled oscillator VCO (10) is employed for converting the input voltage $V_i$ (8) into a first frequency $f_1$ (14) corresponding to the input voltage $V_i$ (8). There is preferably a linear correspondence between the input voltage $V_i$ (8) and the first frequency $f_1$ (14). Therefore, as the input voltage $V_i$ (8) changes, the frequency signal $f_1$ (14) preferably changes in a proportional and linear manner. The output of the voltage-controlled oscillator VCO (10) can also be amplified by conventional means to enhance the first frequency signal $f_1$ (14) prior to its transmission to the control system $V_{low}$ (4). An amplification apparatus $f_{amp}$ (16) can be used to boost the amplitude of the first frequency $f_1$ (14), at the output of the voltage-controlled oscillator VCO (10). This amplification apparatus $f_{amp}$ (16) can be a component or arrangement of components suitable for providing a functioning signal to a fiber optic conversion device $FO_s$ (18).

In operation, for example, if several discrete amplitudes of the input voltage $V_i$ (8) are provided as −1000 volts, 0 volts and +1000 volts, the frequencies $f_1$ (14) directly corresponding to these voltages can be, respectively, 500 kHz, and 750 kHz and 1000 kHz. In this example, then, a directly proportional relationship is established between the input voltage $V_i$ (8) and the first frequency signal $f_1$ (14).

It can be appreciated that the voltage-controlled oscillator VCO (10) can also include an offset apparatus $V_{offset}$ (20) to establish a minimum amplitude $V_{min}$ (22) for the input voltage $V_i$ (8). The offset apparatus $V_{offset}$ (20) accordingly also affects the minimum frequency $f_1$ (14) at the output of the voltage-controlled oscillator VCO (10).

Referring again to the FIGURE, the conversion device $FO_s$ (18) is connected to the output of the voltage-controlled oscillator VCO (10) to convert the first frequency signal $f_1$ (14) into a light signal LS (26) representative of the first frequency signal $f_1$ (14). The preferred system of the present invention includes conversion of the output electrical frequency signal $f_1$ (14) to light by using the conversion device $FO_s$ (18) and then transmitting the light signal LS (26) through a fiber optic cable FOC (28) to a receiving device $FO_r$ (30). The conversion device $FO_s$ (18) can be a conventional component used to convert electrical signals into light signals and can be a conventional electrical component such as one sold under the trade-designated component number HFBR-1521.

The receiving device $FO_r$ (30) is connected to the fiber optic cable FOC (28) for receiving the light signal LS (26). The receiving device $FO_r$ (30) can be a conventional component suited to perform the function of receiving the light signal LS (26) or can be one sold under the trade-designated component number HFBR-2521. The light signal LS (26) is then converted into an electrical signal, or second frequency signal $f_2$ (32), by the receiving device $FO_r$ (30).

The second frequency signal $f_2$ (32) is then fed into a counter C (34) that is incremented or decremented each time that a discrete pulse of the second frequency signal $f_2$ (32) is received from the receiving device $FO_r$ (30). The counter C (34) is preferably provided as a continuous counter known to those skilled in the art which resumes counting from zero once either the upper or lower limit of the counter C (34) has been reached. An important feature of this type of "free-running" counter is that it does not lose counts. If a count is missed in a given sampling interval, then the count is included in the next sampling interval. The present invention therefore provides the benefit of generating an enhanced cumulative average accuracy for the sampled second frequency signal $f_2$ (32).

Referring again to the FIGURE, reconstruction of the power voltage $V_i$ (8) into a representative control voltage $V_c$ (6) in the control system $V_{low}$ (4) is accomplished by use of a conventional, suitable microprocessor $\mu P$ (36) coupled to the counter C (34) to sample the counter C (34) at fixed time intervals t. In a typical operating range of about 50 Hz to 60 Hz for the excitation system, this means that a sampling interval of 1 ms, for example, would result in sampling the counter C (34) about 16 times for a 60 Hz level of operation. The microprocessor $\mu P$ (36) samples the counter C (34) preferably with a period t of about 0.5 ms to 1.0 ms to reconstruct the input voltage $V_i$ (8) as a control voltage $V_c$ (6). The microprocessor $\mu P$ (36) can therefore be used to reconstruct the input voltage $V_i$ (8) of the power system $V_{high}$ (2) in the control system $V_{low}$ (4) as an integrated voltage. The microprocessor $\mu P$ (36) preferably polls the counter C (34) at fixed time intervals t and using a new count, $t_0+t$; a previous count, $t_0-t$; and the time between the sampled counts, reconstructs the input voltage $V_i$ (8) into the control voltage $V_c$ (6).

It can therefore be understood that the first frequency signal $f_1$ (14) is transmitted to a control system $V_{low}$ (4) that typically has a microprocessor $\mu P$ (36) to process the signal (14). The voltage isolation between the power system $V_{high}$ (2) and the control system $V_{low}$ (4) is typically about 5 kV or greater. The control system $V_{low}$ (4), having a microprocessor, semiconductors and other similarly sensitive electronics incorporated therein, is thereby not subjected to high potentials or "fast" voltage transients from the input voltage $V_i$ (8) generated in the power system $V_{high}$ (2). The fiber optic cable FOC (28) is used to transmit the first frequency signal $f_1$ (14) and promote voltage isolation between the power system $V_{high}$ (2) and the control system $V_{low}$ (4)

It can be appreciated that an important benefit the present invention is that relatively large transients are filtered from the reconstructed control voltage $V_c$ (6). The fiber optic cable FOC (28) of the present invention provides voltage isolation between the power system and the control system in the range of approximately 5 $kV_{rms}$ between the low voltage side $V_{low}$ (2) and the high voltage side $V_{high}$ (4).

In another aspect of the invention, shunt voltages can be measured in the range of −100 mv to +100 mv, approximately corresponding to a frequency range of 500 kHz to 1 MHz. Likewise, on a comparatively higher voltage scale for such shunt voltages, the range of −2000 v to +2000 v approximately corresponds to a frequency range of 500 kHz to 1 MHz.

The frequency at which the microprocessor samples the counter and the frequency of the VCO output are factors that limit the bandwidth of a transmitted signal. Therefore, in another aspect of the present invention, it can be appreciated a higher VCO frequency coupled with an increased sampling rate of the microprocessor permits higher frequency input voltages to be measured. Input voltage frequencies up to 600 Hz, for example, can be measured by this invention.

To measure frequencies in this range, the microprocessor sampling rate can be increased to approximately 500 ms, for example.

It can therefore be appreciated that the present invention provides significant improvements over conventional systems and devices employed for voltage isolation between a power system and a control system in an electrical rotating apparatus. The use of fiber optic technology, such as a fiber optic cable, provides voltage isolation between these systems and promotes enhanced signal integrity and reduction in signal noise. Another benefit of the transducering provided by this invention is that it can be applied to measure both AC and DC voltages without a substantial difference in performance.

Whereas particular embodiments of this invention have been described above for purposes of illustration, it will be evident to those skilled in the art that numerous variations of the details of the present invention may be made without departing from the invention as defined in the appended claims.

What is claimed is:

1. In an excitation system for a rotating electrical apparatus including an input voltage generated in a power system of said excitation system, a control voltage isolation system for generating a control voltage representative of said input voltage in a control system of said excitation system, comprising:
    a. voltage-controlled oscillating means for converting said input voltage into a first frequency signal corresponding to said input voltage, said input voltage having a range of voltages, said first frequency signal having a range of frequencies corresponding to said range of voltages, said oscillating means including offset means for establishing a minimum amplitude for voltage input to said oscillating means, in order that said range of frequencies of said first frequency signal has a minimum frequency which is greater than zero;
    b. conversion means connected to said voltage-controlled oscillating means for converting said first frequency signal into a light signal;
    c. fiber optic transmission means connected to said conversion means for transmitting said light signal;
    d. receiving means connected to said fiber optic transmission means for converting said light signal into a second frequency signal; and,
    e. reconstruction means for receiving said second frequency signal and reconstructing therefrom a control voltage in said control system representative of said input voltage.

2. The system of claim 1, wherein said reconstruction means includes a counting means coupled to said receiving means for providing an indication of the frequency of said second frequency signal.

3. The system of claim 2, wherein said reconstruction means includes a processing means coupled to said counting means to reconstruct said control voltage by sampling said counting means.

4. The system of claim 3, wherein said processing means samples said counting means at fixed time intervals.

5. The system of claim 4, wherein said processing means samples said counting means at the rate of about 0.5 ms to 1.0 ms.

6. The system of claim 1, wherein said first frequency signal is linearly proportional to said input voltage.

7. The system of claim 1, wherein said oscillating means further includes a scaling means for reducing voltage input to said oscillating means.

8. The system of claim 1, wherein said oscillating means includes amplification means at an output of said oscillating means for amplifying said first frequency signal.

9. The system of claim 1, wherein said first frequency signal has a maximum frequency, which is about two times said minimum frequency.

10. The system of claim 1, wherein said second frequency signal has a frequency; wherein said reconstruction means includes counting means coupled to said receiving means for providing an indication of the frequency of said second frequency signal and processing means coupled to said counting means to reconstruct said control voltage by sampling said counting means, said processing means sampling said counting means in a plurality of time intervals to provide a plurality of count values, with each of said count values being substantially greater than zero for said minimum frequency.

11. In an excitation system for a rotating electrical apparatus including an input voltage generated in a power system of said excitation system, a method for generating a control voltage representative of said input voltage in a control system of said excitation system, comprising:
    a. converting said input voltage, which has a range of voltages, into a first frequency signal corresponding to said input voltage, said first frequency signal having a range of frequencies corresponding to said range of voltages, in order that said range of frequencies has a minimum frequency which is greater than zero;
    b. converting said first frequency signal into a light signal;
    c. transmitting said light signal using fiber optic transmission means;
    d. converting said light signal into a second frequency signal; and,
    e. receiving said second frequency signal and reconstructing therefrom a control voltage in said control system representative of said input voltage.

12. The method of claim 11, wherein said reconstructing step includes sampling said second frequency signal at a predetermined time interval to provide an indication of the frequency of said second frequency signal.

13. The method of claim 12, wherein said reconstructing step further includes using a processing means for reconstructing said control voltage by sampling said second frequency signal.

14. The method of claim 13, wherein said reconstructing step further includes using a continuous counter for including, in a subsequent time interval, an indication of said second frequency signal not included in a prior occurring said predetermined time interval.

15. The method of claim 13, further including sampling said second frequency signal at the rate of about 0.5 ms to 1.0 ms.

16. The method of claim 11, further including establishing a minimum amplitude for said input voltage prior to converting said input voltage into a first frequency signal.

17. The method of claim 11, further including amplifying said first frequency signal.

18. The method of claim 11, further including employing said first frequency signal with a maximum frequency, which is about two times said minimum frequency.

19. The method of claim 11, further including providing a count from said second frequency signal; and reconstructing said control voltage by sampling said count in a plurality of time intervals to provide a plurality of count values, with each of said count values being substantially greater than zero for said minimum frequency.

* * * * *